(12) United States Patent
Chen et al.

(10) Patent No.: US 8,664,569 B2
(45) Date of Patent: Mar. 4, 2014

(54) LOW CARBON, HIGH SPEED METAL CORE WIRE

(75) Inventors: Fuhu Chen, Miamisburg, OH (US); Sundaram Nagarajan, Troy, OH (US)

(73) Assignee: Hobart Brothers Company, Troy, OH (US)

( * ) Notice: Subject to any disclaimer, the term of this patent is extended or adjusted under 35 U.S.C. 154(b) by 1477 days.

(21) Appl. No.: 10/880,078

(22) Filed: Jun. 29, 2004

(65) Prior Publication Data

US 2005/0045612 A1 Mar. 3, 2005

Related U.S. Application Data

(63) Continuation of application No. 09/683,523, filed on Jan. 13, 2002, now Pat. No. 6,787,736.

(51) Int. Cl.
*B23K 35/22* (2006.01)

(52) U.S. Cl.
USPC ............ 219/146.1; 219/145.1; 219/146.41; 219/146.51; 219/146.31

(58) Field of Classification Search
USPC ............ 219/146.1, 145.1, 146.41, 146.51, 219/146.31
See application file for complete search history.

(56) References Cited

U.S. PATENT DOCUMENTS

| | | | |
|---|---|---|---|
| 3,539,765 A * | 11/1970 | Duttera et al. | 219/146.52 |
| 3,635,698 A | 1/1972 | Heuschkel | |
| 3,656,918 A | 4/1972 | De Long et al. | |
| 3,800,405 A | 4/1974 | Ziemek | |
| 3,848,109 A | 11/1974 | Zvanut | |
| 4,331,857 A | 5/1982 | Crisci et al. | |
| 4,423,119 A * | 12/1983 | Brown et al. | 428/558 |
| 4,571,480 A * | 2/1986 | Sakai et al. | 219/146.3 |
| 4,593,174 A | 6/1986 | Saito et al. | |
| 4,782,211 A | 11/1988 | Kiilunen | |
| 4,810,850 A * | 3/1989 | Tenkula et al. | 219/146.1 |
| 5,332,628 A * | 7/1994 | Drossman | 428/558 |
| 5,365,036 A | 11/1994 | Crockett et al. | |
| 5,523,540 A | 6/1996 | Coldren et al. | |
| 5,688,420 A * | 11/1997 | Gotoh et al. | 219/145.23 |
| 5,824,992 A * | 10/1998 | Nagarajan et al. | 219/145.22 |
| 5,837,326 A * | 11/1998 | Dallaire et al. | 427/449 |
| 5,857,141 A | 1/1999 | Keegan et al. | |
| 6,608,284 B1 | 8/2003 | Nikodym | |

FOREIGN PATENT DOCUMENTS

| | | | | |
|---|---|---|---|---|
| JP | 61001499 A * | 1/1986 | | B23K 35/368 |
| JP | 63220996 A * | 9/1988 | | B23K 35/368 |
| JP | 63299889 A * | 12/1988 | | B23K 35/368 |
| RU | 1780253 A1 * | 2/1997 | | B23K 35/368 |

* cited by examiner

*Primary Examiner* — Alexandra Elve
(74) *Attorney, Agent, or Firm* — Patentbar International, P.C.

(57) ABSTRACT

The present invention is a weld wire comprising a sheath encapsulating a metal core made of powdered metal, wherein a fill percentage of the metal core is no less than approximately 12%. The metal core comprises a core composition alloyed with an alloying element or an combination of elements comprising Cr, Mo, V, W, Hf and Nb or combinations thereof, wherein a total weight percentage of the alloying element or the combination of elements in the core composition does not exceed approximately 1%. In a particular embodiment, the alloying element is Mo in the amounts selected from the range of about 0 to about 0.5 percent by weight and the fill percentage of the metal core is selected from the range of about 12% to about 30%. In a particular embodiment of the invention, the total percentage of the combination of elements is selected from the range of about 0.4% to about 0.8%.

1 Claim, 7 Drawing Sheets

T067, 65in/min.

T067, 75 in/min

T067, 80 in/min.

T067, 90in/min

T058, 120 in/min

T058, 130 in/min

T058, 140 in/min  FIG 5G
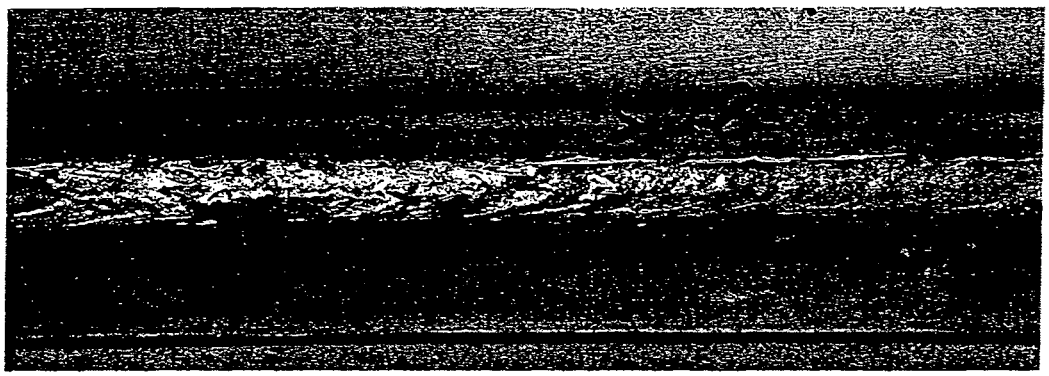
FIG 5H
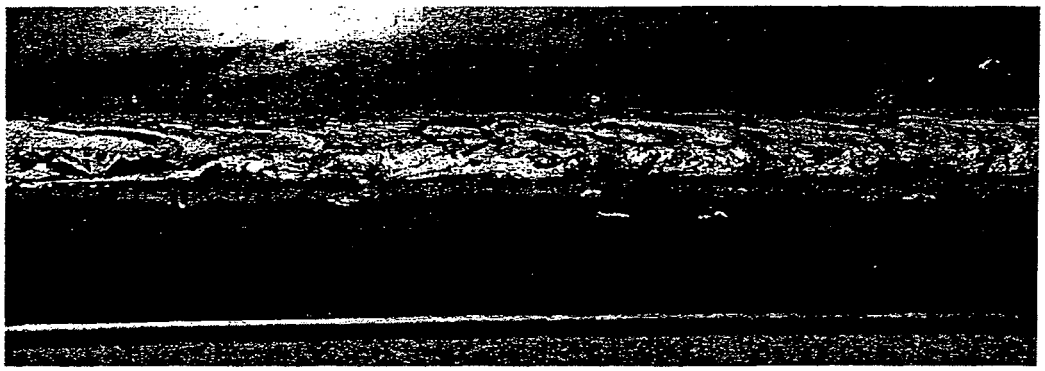
T058, 145 in/min

LOW CARBON, HIGH SPEED METAL CORE WIRE

RELATED APPLICATIONS

This application is a Continuation of Ser. No. 09/683,523 filed on Jan. 13, 2002 and issued as U.S. Pat. No. 6,787,736 on Sep. 7, 2004 which is incorporated by reference herein in its entirety.

BACKGROUND OF INVENTION

The present invention relates generally to gas metal arc welding. More particularly, the present invention relates to a composition and properties of a family of consumable electrodes for gas metal arc welding of carbon steels.

The growing demand for increased electric arc welding productivity calls for continuing efforts to reduce welding time while improving productivity of structural fabrication, especially for the robotic applications. In order to operate a robotic welder at its maximum capacity, welding consumables should be able to provide good welding beads at the maximum travel speed without increasing the number of welding defects. One of the approaches to improve the productivity and reduce the welding time would be to increase the deposition rate and travel speed for a given weld size. Unfortunately, it often happens that an increase in a travel speed of a welding process is accompanied by an increase in the number of welding defects.

Another approach to solving the problem is to try to manipulate the composition and structure of a welding electrode to change its properties in such a way that the deposition rate and travel speed of a welding process will increase advantageously. The electric arc welding process often uses metal consumable electrodes in the form of tubular welding wires. These metal core welding wires are usually made of generally tubular composites having a metal sheath and a core made of various powdered materials. The known tubular types of wires can be classified as metal core wires or flux-core wires. Metal core wire electrodes, with relatively simple chemical composition and known metallurgy, have a high deposition rate and high deposition efficiency while producing less slag, and, therefore, are increasingly used as an alternative to solid or conventional flux core wires for improved productivity in structural fabrication. If higher deposition rates exhibited by metal core wires could be combined with a high travel speed and a good quality welding bead, a welding electrode having such a metal core wire would greatly increase the productivity of arc welding used in many applications in the automotive, shipbuilding and general fabrication industry.

Conventional metal core wires of the type described in a number of U.S. Patents relate to different types, structures or combinations of elemental composition of welding electrodes. For example, U.S. Pat. No. 3,656,918, relates to an alloy suitable for use as a weld-filler material with about 2% of Mo as one the alloying elements in combination with Cr and Ni. U.S. Pat. No. 3,635,698 relates to a weld-filler metal made of a low alloy steel alloyed by a combination of Ni, Cr and Mo. U.S. Pat. No. 4,782,211 relates to a cluster welding electrode assembly having a rod covered with a flux alloyed by defined amounts of Mo and W. That Patent mentions that controlled amounts of tungsten, preferably in the form of a ferrotungsten alloy, appear to modify the working characteristics of the weld metal. U.S. Pat. No. 5,523,540 relates to a welding electrode of a composition within certain elemental composition ranges. The welding electrodes of that Patent form weld deposits with a low carbon bainitic ferrite microstructure of sufficient strength for welding high-strength steels. U.S. Pat. No. 5,824,992 relates to a metal-core wire with a core composition between approximately 2.5-6.0% or 2.5-12% of the total weight of the metal-core wire.

Manufacturing of a metal core wire normally involves forming, filling and then drawing or rolling the wire. First, a steel sheath is formed and bent into a U-shape tube, then an amount of metal powder, such as iron powder, is fed into the U-shaped tube. The subsequent forming and drawing process encloses and compacts the powder to form a wire and reduces that wire to its final shape. If an improved metal-core wire with a higher deposition rate and travel speed manufactured as described above could be provided, the productivity of the robotic arc welders could be significantly increased.

It is therefore an object of the present invention to provide a metal core wire and a method of manufacturing such a wire allowing an 15-20% increase in the deposition rates.

It is also an object of the present invention to provide a composition of a metal core wire electrode leading to a 45-50% increase in the welding electrode travel speed.

It is also an object of the present invention to provide carbon steel composite core wires exhibiting a combination of high melting points and appropriate surface tension of the molten wire, which combination leads to a high deposition rate and travel speed in the welding process.

SUMMARY OF INVENTION

The present invention is a weld wire comprising a sheath encapsulating a metal core made of powdered metal, wherein a fill percentage of the metal core is no less than approximately 12%. The metal core comprises a core composition alloyed with an alloying element or an combination of elements comprising Cr, Mo, V, W, Hf and Nb or combinations thereof, wherein a total weight percentage of the alloying element or the combination of elements in the core composition does not exceed approximately 1%. In a particular embodiment, the alloying element is Mo in the amounts selected from the range of about 0 to about 0.5 percent by weight and the fill percentage of the metal core is selected from the range of about 12% to about 30%. In a particular embodiment of the invention, the total percentage of the combination of elements is selected from the range of about 0.4% to about 0.8%.

To achieve a 15-20% increase in the deposition rates of the wires, the present invention provides a sheath encapsulating a steel core having a core fill percent of more than 12% and the steel core having a composition comprising an alloying element selected from the group consisting of Cr, Mo, V, W, Hf and Nb and combinations thereof. The deposition rates of such wires increases with the increase of the core fill percent, when the wire is used in the welding process. In particular, the deposition rate increases from about 15 lb/hr for the core fill percent of about 12% to the deposition rate of about 20 lb/h for the core fill percent of about 30%. In particular embodiments, a total weight percentage of Mo varies from about 0% to about 0.4%, and a total weight percentage of an alloying element does not exceed approximately 1%.

To achieve a 40-50% increase in the travel speed, the wire of the present invention comprises a sheath encapsulating a metal core, wherein a core fill percent of the metal core is higher than 12%, the metal core having a composition alloyed with an alloying element or an combination of elements comprising Cr, Mo, V, W, Hf and Nb or combinations thereof, wherein a total weight percentage of the alloying element or the combination of elements in the core composition does not exceed approximately 1%, and wherein a travel speed of the weld wire when used in welding ranges from about 65 in/min to about 145 in/min. The travel speed of the wire when used in welding can be characterized via a maximum travel speed ranging from about 80 in/min to about 145 in/min for the core fill percent ranging from about 12% to about 30%. The maximum travel speed of the wire measured during the welding experiments of the present invention corresponded to the composition comprising a percentage of Mo ranging from about 0% to about 0.4%.

A method of manufacturing a weld wire comprises forming a sheath into a shape which can be filled with a metal powder; filling the sheath with the metal powder, the metal powder having a composition alloyed with an alloying element or an combination of elements comprising Cr, Mo, V, W, Hf and Nb or combinations thereof, wherein a total weight percentage of the alloying element or the combination of elements in the core composition does not exceed approximately 1%. Further in the manufacturing process the metal powder is compacted to form a metal core; and the wire is drawn to achieve a core fill percentage of the metal core no less than 12%. According to the invention, the core fill percentage ranges from about 12% to about 30%, the alloying element is Mo ranging from about 0% to about 0.4%. The total weight percentage of the combination ranges from about 0.4% to about 0.8%.

These and other objects, features and advantages of the present invention will become more fully apparent upon consideration of the following detailed description of the invention with the accompanying drawings.

BRIEF DESCRIPTION OF DRAWINGS

FIGS. 5(a)-(h) are the photos of the welding specimens provided in Table 5.

DETAILED DESCRIPTION

Figure 1:
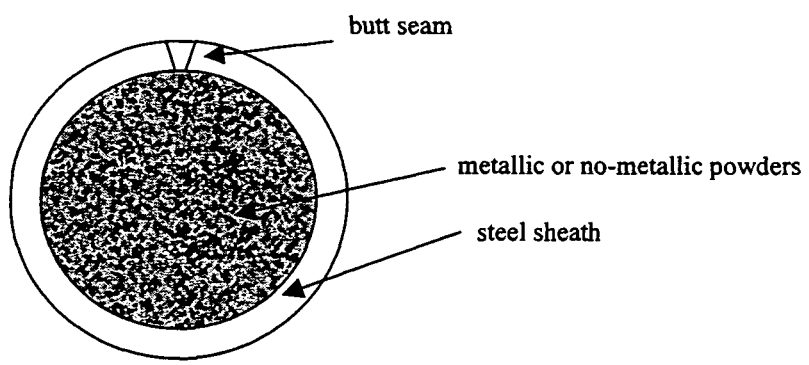
FIG. 1 is a sectional view of a metal core wire.

The present invention comprises is based on a metal core wire of a mild steel metal core of Fe, Mn and Si, wherein Mn and Si are the main alloying elements. A more detailed composition of the wire is provided in Table 1, which composition corresponds to the E70C-6C type electrode of the American Welding Society (AWS) specification A5.18.

Table 1. Conventional low carbon steel metal core electrode weld metal composition (AWSA.5.18).

[t1]

TABLE 1

| Elemental Composition | AWS A5.18 |
| --- | --- |
| Mn | Up to 1.7 |
| Si | Up to 0.9 |
| Cu | Up to 0.5 |
| S | Up to 0.03 |
| P | Up to 0.03 |
| Fe | Balanced |

The main function of Mn and Si in such wires is to deoxidize the metal deposited during the welding process and to modify the microstructure of the deposited metal to obtain the desired mechanical properties. Additionally, Si increases bead wetting, therefore, improving the weldability of the deposited wire. As provided in Table 1, small amounts of metallic and non-metallic additions (Cu, S, P) to the metal powder stabilize the arc and reduce the amount of diffusible hydrogen during the welding process. The metallic fraction in a wire electrode is normally no less than about 95 Wt % of the total weight of the electrode, while the weight of the core composition falls within to the range of about 10 Wt % to about 20 Wt % of the total wire weight.

The metal core wire of the present invention is characterized by a specific elemental composition which reduces the surface tension of the molten weld metal of the composite wire described in the previous paragraph. The reduction in the surface tension occurs due to the alloying of the core composition of the wire with a single addition or combination of Cr, Mo, V, W, Hf and Nb. The reduced surface tension helps spread the molten weld metal in the arc gouge area—the portion of a base metal that has been melted by the arc, but which has not been filled with the molted weld or a filler metal yet. A composition for the metal core electrode wire of the present invention is provided in Table 3.

Table 3. (The total percentage of Cr, Mo, W, V, Hf, and Nb not to exceed 1%).

Elemental composition for the metal core electrode weld metal composition of the present invention.

[t2]

TABLE 3

| Mn | Up to 1.7 |
| --- | --- |
| Si | Up to 0.9 |
| Hf | Up to 0.5 |
| Cr | Up to 0.5 |
| Mo | Up to 0.5 |
| W | Up to 0.5 |
| V | Up to 0.5 |
| Nb | Up to 0.5 |
| Cu | Up to 0.5 |
| S | Up to 0.03 |
| P | Up to 0.03 |
| Fe | Balanced |

Another reason to alloy the metal core wire electrode with a single addition or a combination of Cr, Mo, V, W, Hf and Nb is the increase in the welding speed occurring due to the increase in the freezing range of the molten weld (and, therefore, the decrease in the solidification rates). Since high travel speeds lead to high solidification rates, the molten weld is usually can not completely fill the gouge due to an insufficient time available for such filling, resulting in the creation of undercuts, humps and other defects that can be formed in the arc gouge area. Increasing the freezing ranges of the wires, as achieved in the present invention, improves the wetting of the base metal and slows down the solidification process, allowing enough time for the molten weld to better fill the gouge. Examples of the experiment wires and their compositions are provided in Table 2. In particular, the experimental wires are alloyed with various percentages of Mo (about 0%, about 0.2% and about 0.4%) while having fill percentages varying from 12% to 30%.

Table 2: Experimental wires (Dia-1.4 mm) and their compositions:

TABLE 2

|  | Fill % | C | Mn | Si | Ni | Mo |
|---|---|---|---|---|---|---|
| Test 067 | 12 | 0.041 | 1.437 | 0.549 | 0.018 | 0.026 |
| Test 068 | 18 | 0.028 | 1.394 | 0.540 | 0.028 | 0.027 |
| Test 069 | 24 | 0.025 | 1.693 | 0.662 | 0.032 | 0.032 |
| Test 070 | 30 | 0.024 | 1.018 | 0.325 | 0.033 | 0.030 |
| Test 066 | 12 | 0.043 | 1.314 | 0.497 | 0.016 | 0.219 |
| Test 056 | 18 | 0.033 | 1.256 | 0.456 | 0.022 | 0.196 |
| Test 058 | 24 | 0.027 | 1.183 | 0.428 | 0.023 | 0.206 |
| Test 059 | 30 | 0.031 | 1.320 | 0.456 | 0.021 | 0.192 |
| Test 071 | 12 | 0.021 | 1.278 | 0.419 | 0.016 | 0.403 |
| Test 072 | 18 | 0.039 | 1.246 | 0.456 | 0.019 | 0.421 |
| Test 073 | 24 | 0.036 | 1.275 | 0.489 | 0.016 | 0.418 |
| Test 074 | 30 | 0.035 | 1.173 | 0.414 | 0.020 | 0.415 |

It should be understood that while the presented experimental results pertain to alloying the test wires with Mo, it has been established that alloying the wires with single additions or combinations of Cr, Mo, V, W, Hf and Nb produces experimental results comparable to the ones provided for Mo. Usually the weight percent of the alloying combination did not exceed 1%, and in most cases the weight percent of the alloying combination was within the range from about 0.4 to about 0.8%.

The high fill percentages of the alloying elements in the experimental wires of Table 1 are significant for achieving improvement of both the deposition rate and the wetting action of the molten metal. The deposition rates of 12 different test wires according to the compositions listed in Table 2 were measured for the 1.4 mm diameter experimental wires at 350 A, 34V, DCEP, depending on the fill percentage of the wires. The fill percentages of the wires in Table 2 varied from about 12% to about 30% for the series of wires alloyed with about 0%, 0.2% and 0.4% of Mo respectively.

Figure 3:
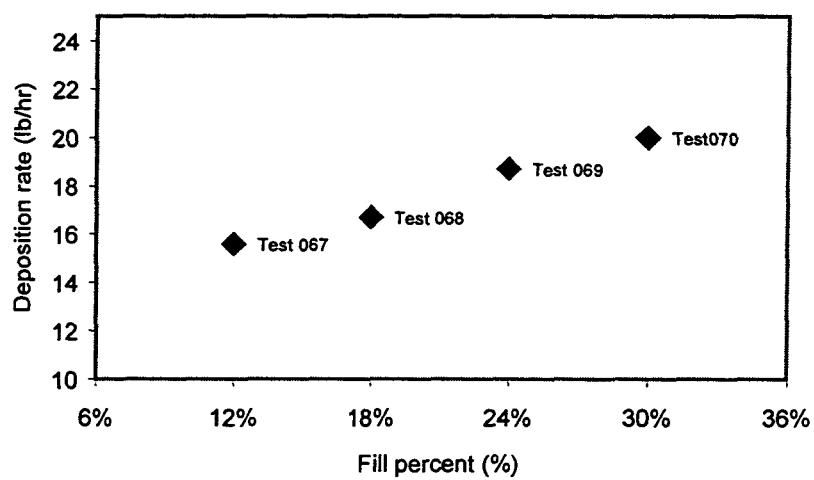
FIG. 3 is a graph illustrating the relationship between deposition rates and core fill percentages.

FIG. 3 illustrates the results of these measurements of the deposition rates for experimental wires 067-070, corresponding to the compositions with almost 0% of Mo. As follows from FIG. 3, the deposition rate of wire 070 with about 30% core fill is about 20 lb/h, which is much higher than the deposition rate of about 15.6 lb/h of wire 060 with only about 12% core fill. The observed increase in the deposition rate happens due to the increase in electrical resistance of the wire with a higher core fill percent. More specifically, the higher core fill provides a higher proportion of the metal powder material in the cross-section of the wire relative to the total cross-section of the wire. Since the powder metal core wire exhibits higher electrical resistance than the wire of the same diameter with a solid metal core, the higher fill metal powder core wire generates more heat during the welding process and, therefore, leads to the higher deposition rates. It is noted that in the context of the present invention the term "solid metal core" means a metal core made of bulk metal and not of a compacted metal powder.

Figure 2:
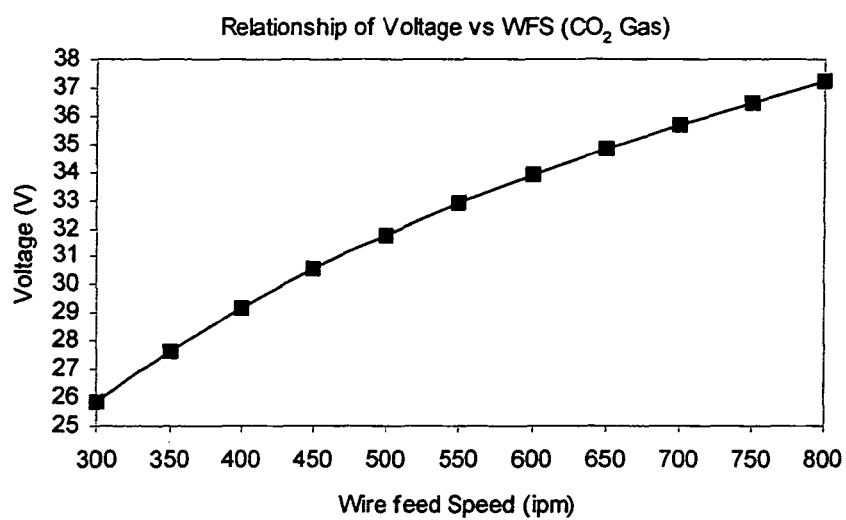
FIG. 2 is a graph illustrating the voltage-wire feed speed relationship.

In order to provide consistent results in welding processes demonstrating high deposition rates and high travel speed, it is important to have a way to determine and select the optimized welding parameters for such processes. The parameters of interest in the electrical arc welding with consumable electrodes are wire feed speed, voltage and travel speed. If non-optimized welding parameters are selected, then a high defect rate and low quality of welds are likely to occur. For a fixed size fillet welding process, which uses constant voltage, the wire feed speed is usually proportional to the wire travel speed, assuming that the deposition efficiency is constant. Deposition efficiency refers to a percentage of weight of the wire that is actually deposited on the base metal and not lost in slag, sputter or flume. For most metal core consumable welding wires the deposition efficiency is usually in the range of 90-98%, which may vary slightly during the welding process. Considering an a illustrative example, for a ⅛ inch joint fillet weld, the travel speed equals about 20-25% of the wire speed and an approximately constant voltage. FIG. 2 provides the data on the wire feed speed and voltage for a number of listed specimen. FIG. 2 illustrates the relationship between the optimized voltage and a wire feed speed used in the experiments of test wires for 1.4 mm wires at a fixed arc length of approximately ⅛". Other welding parameters used to obtain the results of FIG. 2 are ⅛" lap joint, DCEP, 100% $CO_2$ shielding gas, 1 F electrode position at 15 degrees downhill orientation. The length of the arc was calibrated using a high speed CCD camera. The quality of the welds obtained after the welding process was performed on the specimens in Table 5 is illustrated in FIGS. 5(a)-(h).

Figure 4:
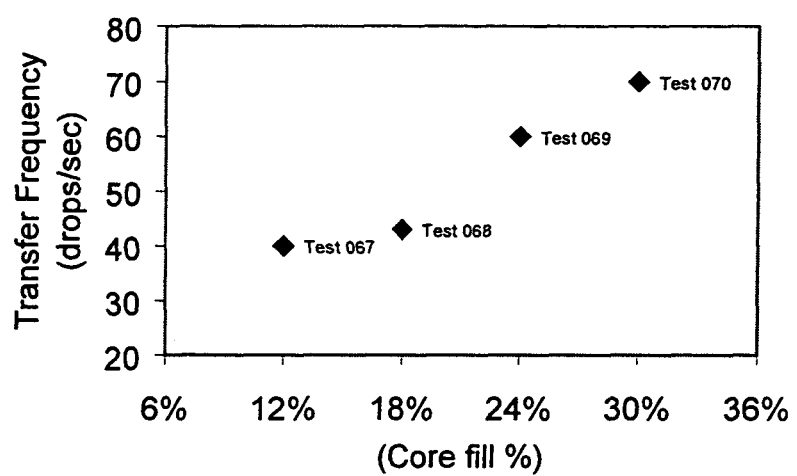
FIG. 4 is a graph illustrating the relationship between transfer frequencies and core fill percentages.
Figure 5A:
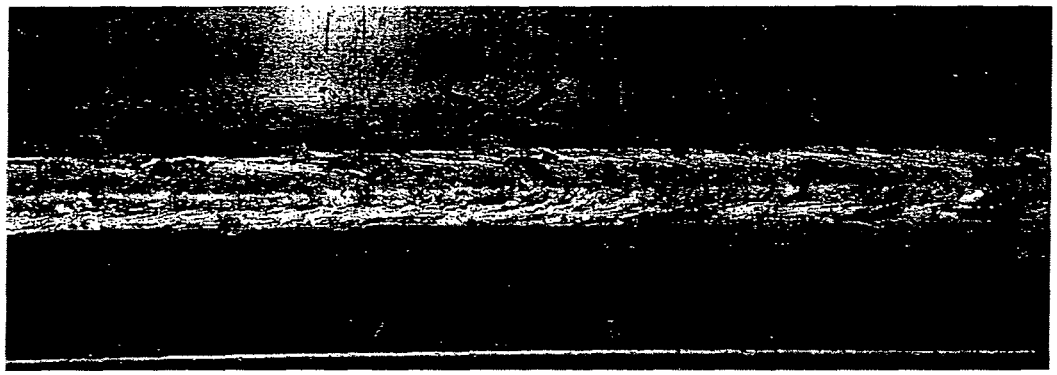
Figure 5B:
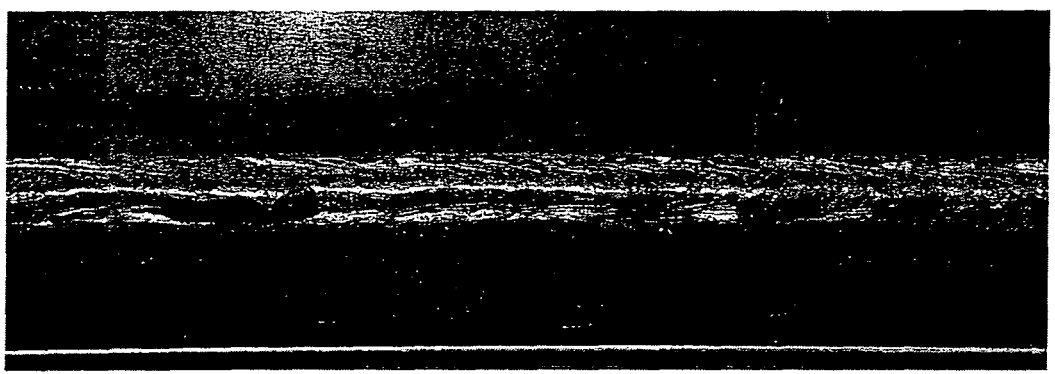
Figure 5C:
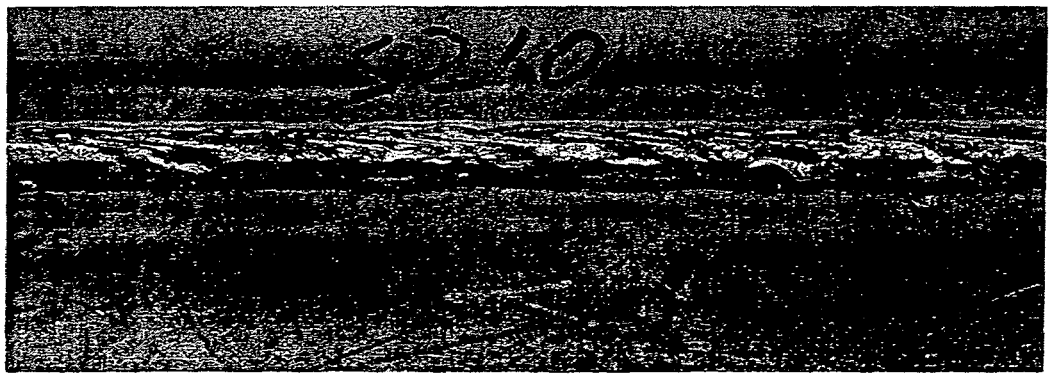
Figure 5D:
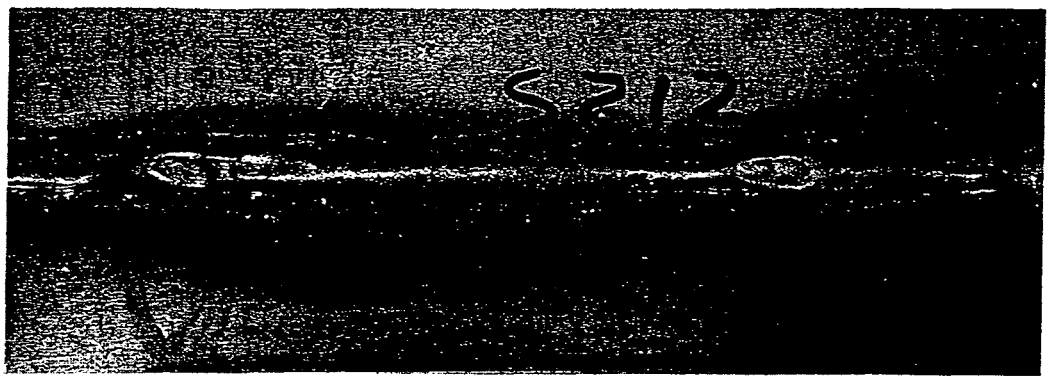
Figure 5E:
Figure 5F:

An additional way of illustrating the advantage of high core fill metal wires is to analyze their droplet transfer frequency during the welding process. The droplet transfer frequency is a major index used in evaluating the stability of the arc. A higher droplet transfer frequency results in a better stability of the arc, as well as in a better convection inside the weld pool, enhanced wetting action of the liquid metal and a reduced spatter level of the wire. For the test wires 067-070 of Table 2, the droplet transfer frequency has significantly increased with the increase of the core fill percentage of the wires, as illustrated in FIG. 4. The droplet frequency data of FIG. 4 were obtained with a high speed CCD camera, the measurements were taken at 350 A, 43V, DCEP).

As follows from FIG. 4, the overall weldability of the wires is improved by increasing their core fill percentage and using the wires of the chemical composition described in the present invention. To further illustrate this finding, Table 4. lists the data showing the increased deposition rates and welding speeds of the welding processes using the experimental wires. The experiments were run for different fill percentages of the series of wires having about 0%, 0.2% and 0.4% of Mo.

Table 4. Deposition rate and maximum travel speeds of the experimental wires.

TABLE 4

|  | % Mo | Fill % | Depositition Rate (lb/hr) | Maximum travel speed (in/min) |
|---|---|---|---|---|
| Test 067 | 0.026 | 12 | 15.6 | 80 |
| Test 068 | 0.027 | 18 | 16.7 | 80 |
| Test 069 | 0.032 | 24 | 18.7 | 80 |
| Test 070 | 0.030 | 30 | 20.0 | 100 |
| Test 066 | 0.219 | 12 | 15.4 | 95 |
| Test 056 | 0.196 | 18 | 15.8 | 100 |
| Test 058 | 0.206 | 24 | 18.2 | 140 |
| Test 059 | 0.192 | 30 | 19.5 | 145 |
| Test 071 | 0.403 | 12 | 16.0 | 95 |
| Test 072 | 0.421 | 18 | 17.1 | 110 |
| Test 073 | 0.418 | 24 | 19.0 | 140 |

TABLE 4-continued

| | Deposititon Rate | | Maximum travel speed |
|---|---|---|---|
| | % Mo | Fill % | (lb/hr) | (in/min) |
| Test 074 | 0.415 | 30 | 20.8 | 140 |

Travel speed measurements in Table 4 were performed according to AWS/ANSI D8.8-89 (SAE HS J1196): Specification for Automotive and Light Truck Components Weld Quality—Arc Welding, which specification is incorporated herein by reference. Test wire 067 in Table 4 is an example of a conventional metal core wires with 10-20% core fill percent and no alloying element of more than 0.1% other than Mn and Si. Its deposition rate is about 15.6 lb/h with a maximum travel speed of 80 in/min. As it can be clearly seen in Table 4, test wire 058, which is an example of the present invention, exhibits a higher deposition rate of 18.2 lb/h with a much higher deposition speed of 140 in/min (maximum travel speed). Noticeably, the best deposition rate and travel speed were exhibited by the test wires combining a high core fill percent with an addition of a controlled amount of the alloying element, Mo.

Manufacturing of a metal core wire of the composition and high fill percentage in accordance with the present invention involves providing a sheath (such as a steel sheath) and forming (often bending) the sheath into a shape that can be filled with a metal powder, such as, for example; iron powder. Often such a shape would be a U-shape. The metal powder has a composition alloyed with a single addition or a combination of Cr, Mo, V, W, Hf and Nb, which is fed into the sheath. The percentage of the combination of the alloying elements usually does not exceed 1%, while the preferred percentage falls within the range between about 0.4% and about 0.8%. When Mo is used as a single alloying element, its percentage varies from about 0% to about 0.4%. The subsequent forming and drawing process encloses and compacts the powder to form a wire and reduce that wire to its final shape with the core filled percentages higher than 12%, as described earlier.

It has been, therefore, demonstrated that an addition of up to 0.4% of Mo to a metal core electrode wire having a core fill percent of more than 12% significantly increases its deposition rate and travel speed without sacrificing the quality of the resulting weld, resulting in a significant increase of productivity of the welding processes. The written description of the invention enables one skilled in the art to make and use what is at present considered to be the best mode of the invention, and it should be appreciated and understood by those skilled in the art that the existence of variations, combinations, modifications and equivalents falls within the spirit and scope of the specific exemplary embodiments disclosed herein. It is also to be understood that the illustrative examples described herein are not to be construed as limiting the present invention in any way. The objects, features and advantages of the present invention as claimed in the appended claims are applicable to all types of metal core wires, such as low carbon metal core, stainless steel metal core and low alloy metal core wires.

What is claimed is:

1. A gas metal arc weld wire comprising a sheath encapsulating a core powder composition, having a core fill percentage that is greater than approximately 12% wt, and consisting essentially of Fe and:
   C in an amount not greater than approximately 0.043% wt;
   Mn in an amount not greater than approximately 1.73% wt;
   Si, in an amount not greater than approximately 0.9% wt;
   P in an amount not greater than 0.03% wt;
   S in an amount not greater than 0.03% wt;
   an alloying element in an amount not greater than approximately 1 weight percent, wherein the alloying element is selected from the group consisting of Cr, Mo, V, W, Hf, Nb, and any combination thereof; and, optionally, at least one of,
   Cu in an amount not greater than approximately 0.5% wt, and
   Ni in an amount not greater than approximately 0.033% wt.

* * * * *